United States Patent
Paleczny et al.

(10) Patent No.: US 8,384,679 B2
(45) Date of Patent: Feb. 26, 2013

(54) PIEZOELECTRIC ACTUATOR ARRANGEMENT

(76) Inventors: Todd Robert Paleczny, Heidelberg (CA); Arnett Ryan Weber, Burlington (CA); Perry Allan Faubert, Surrey (CA)

( * ) Notice: Subject to any disclaimer, the term of this patent is extended or adjusted under 35 U.S.C. 154(b) by 399 days.

(21) Appl. No.: 12/578,082

(22) Filed: Oct. 13, 2009

(65) Prior Publication Data
US 2010/0156843 A1  Jun. 24, 2010

Related U.S. Application Data

(63) Continuation-in-part of application No. 12/342,502, filed on Dec. 23, 2008.

(51) Int. Cl.
*G06F 3/041* (2006.01)
(52) U.S. Cl. .............................. 345/173; 178/18.01
(58) Field of Classification Search .......... 345/173–178; 178/18.01–19.07
See application file for complete search history.

(56) References Cited

U.S. PATENT DOCUMENTS

| | | | |
|---|---|---|---|
| 6,359,758 | B1 | 3/2002 | Boutaghou |
| 6,429,846 | B2 | 8/2002 | Rosenberg et al. |
| 6,744,577 | B1 | 6/2004 | Guo et al. |
| 6,822,635 | B2 | 11/2004 | Shahoian et al. |
| 7,205,978 | B2 | 4/2007 | Poupyrev et al. |
| 7,450,110 | B2 | 11/2008 | Shahoian et al. |
| 7,548,232 | B2 | 6/2009 | Shahoian et al. |
| 2004/0070314 | A1 | 4/2004 | Yoon et al. |
| 2005/0057528 | A1 | 3/2005 | Kleen |
| 2005/0277448 | A1 | 12/2005 | Castaneda et al. |
| 2006/0050059 | A1 | 3/2006 | Satoh et al. |
| 2006/0119586 | A1 | 6/2006 | Grant et al. |
| 2006/0209037 | A1 | 9/2006 | Wang et al. |
| 2007/0103449 | A1 | 5/2007 | Laitinen et al. |
| 2007/0015297 | A1 | 6/2007 | Kim et al. |
| 2008/0024459 | A1 | 1/2008 | Poupyrev et al. |
| 2008/0055277 | A1* | 3/2008 | Takenaka et al. ............ 345/177 |
| 2008/0060856 | A1 | 3/2008 | Shahoian et al. |
| 2008/0068348 | A1 | 3/2008 | Rosenberg et al. |
| 2008/0122315 | A1* | 5/2008 | Maruyama et al. .......... 310/314 |
| 2008/0132313 | A1 | 6/2008 | Rasmussen et al. |
| 2009/0167704 | A1 | 7/2009 | Terlizzi et al. |
| 2010/0182263 | A1* | 7/2010 | Aunio et al. ................. 345/173 |

FOREIGN PATENT DOCUMENTS

| | | |
|---|---|---|
| CA | 2518914 A1 | 9/2004 |
| EP | 1310860 A1 | 5/2003 |
| EP | 1691263 A1 | 8/2006 |
| EP | 1748350 A1 | 1/2007 |
| WO | 2008030594 A2 | 3/2008 |
| WO | WO 2008151863 A1 * | 12/2008 |

OTHER PUBLICATIONS

Extended European Search Report for European Application No. 09173502.7, dated Feb. 23, 2010, 6 pages.
Extended European Search Report for European Application No. 09172937.6, dated Feb. 10, 2010, 6 pages.
Extended European Search Report for European Application No. 09172940.0. dated Feb. 11, 2010, 6 pages.
Extended European Search Report for European Application No. 09172936.8, dated Feb. 4, 2010, 7 pages.
Canadian Examiner's Report for Application 2686289, dated Apr. 19, 2012, 4 pages.
"Interview RIM" from EPO Examiner on Mar. 19, 2012.
European Office Action, European Application 09172940.0, dated Jun. 2010, 5 pages.

* cited by examiner

*Primary Examiner* — Michael Pervan

(57) ABSTRACT

A portable electronic device includes a touch-sensitive display and a piezoelectric actuator arranged to provide tactile feedback to the touch-sensitive display in response to an actuation signal. A pad is disposed in alignment with a force sensor such that depression of the touch-sensitive display causes the force sensor to generate a force signal. A processor configured to receive the force signal and to generate the actuation signal based on the force signal.

23 Claims, 4 Drawing Sheets

PIEZOELECTRIC ACTUATOR ARRANGEMENT

CROSS-REFERENCE TO RELATED APPLICATIONS

This application is a continuation-in-part of prior U.S. patent application Ser. No. 12/342,502, filed Dec. 23, 2008, the entire contents of which application are incorporated herein by reference.

FIELD OF TECHNOLOGY

The present disclosure relates to portable electronic devices, including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
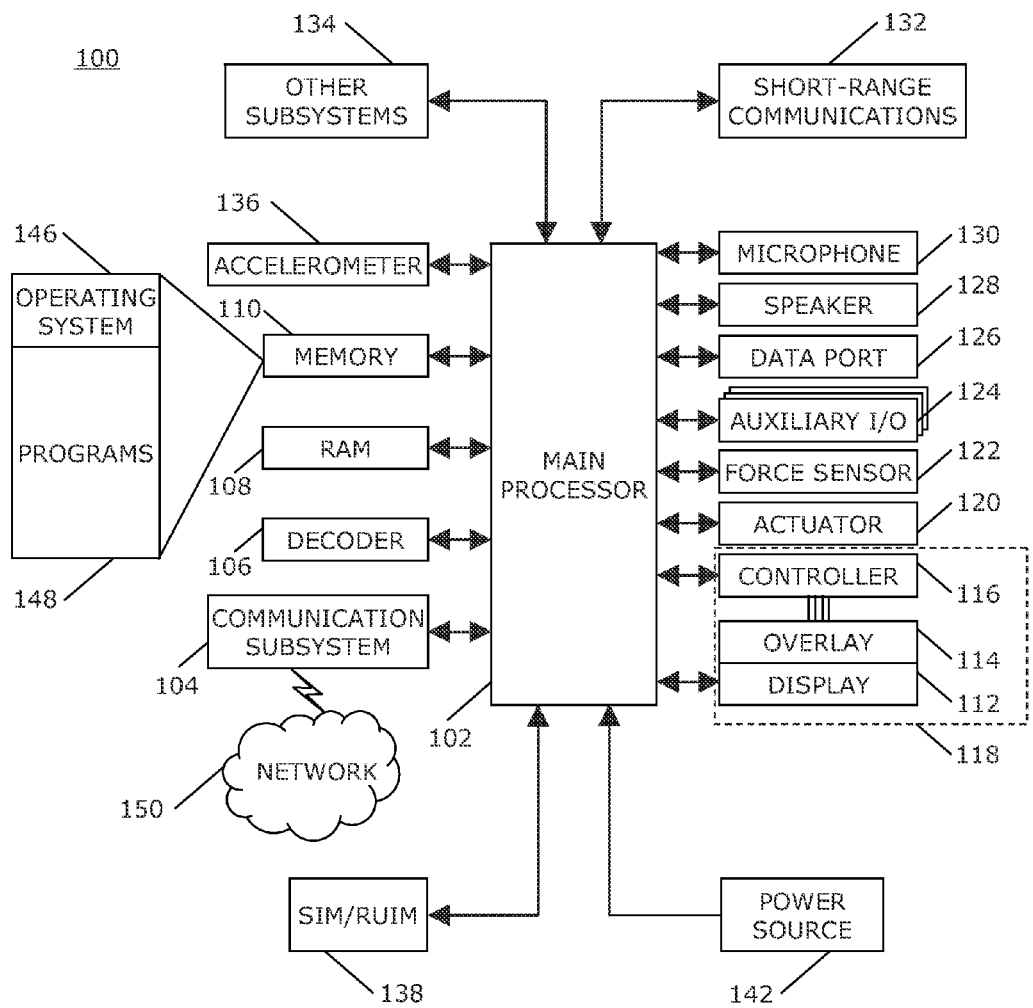
FIG. 1 is a block diagram of a portable electronic device in accordance with the disclosure.

The following describes actuators, force sensors, and pads disposed in a personal electronic device to provide tactile or haptic feedback to a depressible touch-sensitive display. When the touch-sensitive display is depressed, the pad facilitates actuation of the force sensor. The actuators may be controlled, e.g., via a processor, to provide tactile feedback via the touch-sensitive display, for example, to simulate depression or actuation of a switch, such as switch that may be utilized as part of a physical key of a keyboard, e.g., a dome switch, snap switch, or any other type of switch that may be simulated. Other types of tactile feedback may also be provided via such control. Such tactile feedback may be provided in response to depression and release of the touch-sensitive display.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 2:
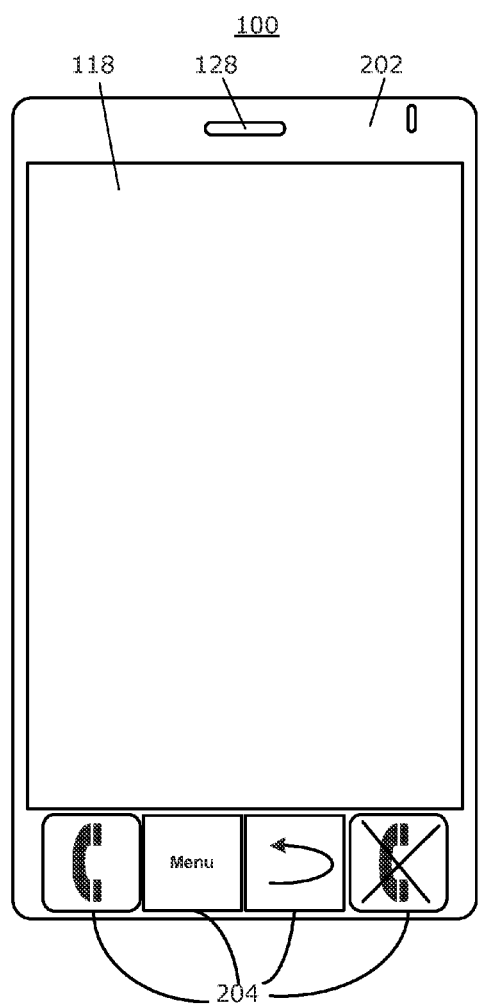
FIG. 2 is a front view of an example of a portable electronic device in accordance with the disclosure.

A front view of a portable electronic device 100 having a touch-sensitive display 118 is shown in FIG. 2. A housing 202, the speaker 128, and various physical buttons or keys 204 are also shown. Although the keys 204 are shown separate from the touch-sensitive display, the keys 204 may alternatively be soft or virtual keys displayed on the touch-sensitive display 118. The present disclosure may be applied to other touch-sensitive input devices, such as touch pads with tactile feedback.

Figure 3:
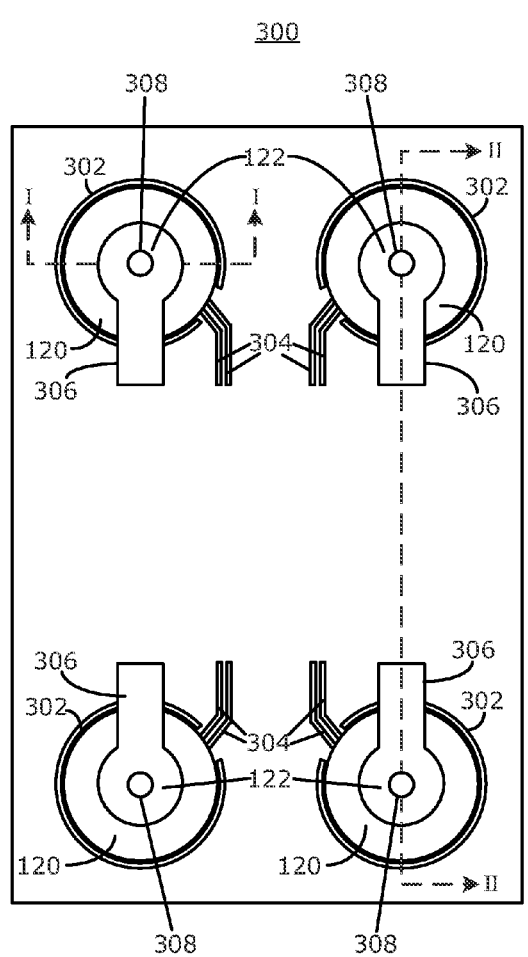
FIG. 3 is a top view of piezoelectric actuators disposed on a base in accordance with the disclosure.

A top view of piezoelectric ("piezo") actuators 120 disposed on a base 300 is shown in FIG. 3. The base 300 may advantageously be a printed circuit board or other suitable structure. Four supports 302, such as ring-shaped frames, are disposed on the base 300 and surround an opening in the base 300. A piezo actuator 120 is disposed in each support 302. Other electronic and or mechanical components may be disposed on the base 300. A force sensor 122 is shown disposed on each actuator 120. One set of conductors 304 disposed on the base electrically connects each piezo actuator 120 to the microprocessor 102. Another set of conductors 306 disposed on the base 300 electrically connects each force sensor 122 to the processor 102. A pad 308 is disposed on each force sensor 120 as shown in FIG. 3. Although four actuators and force sensors are shown in the example of FIG. 3, any suitable number of these devices may be utilized.

Figure 4:
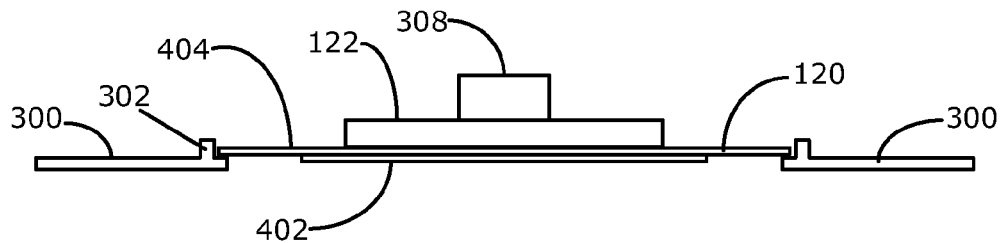
FIG. 4 is a cross-sectional view of a piezoelectric actuator in accordance with the disclosure.

A cross-sectional view of a piezo actuator 120, through line I-I of FIG. 3, is shown in FIG. 4. The piezo actuator 120 is disposed on or within the support 302. The piezo actuator 120 comprises a piezoelectric element 402 fastened to a substrate 404. A force sensor 122 is disposed on the substrate 404, and the pad 308 is disposed on the force sensor 122 in this example.

The base 300 may be comprised of a thermoplastic polymer such as polycarbonate, or other suitable materials such as plastic, fiberglass, and so forth. The substrate 404, which may also be referred to as a shim, may be comprised of nickel or any other suitable material such as, for example, stainless steel, brass, and so forth. The piezo element 402 may be a ceramic disk, and may comprise any suitable number of piezoelectric layers comprised of any suitable piezoelectric material. For example, the piezoelectric element 402 may comprise a single layer of piezoelectric material having a first electrode fastened or integrated to one side and a second electrode fastened or integrated to the opposite side. The electrodes are connected to the conductors 304 shown in FIG. 3. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications. The piezoelectric element 402 may be fastened to the substrate 404 by adhesive, lamination, laser welding, and/or by other suitable fastening method or device.

The force sensors 122 may be force-sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezoelectric element 402, may be utilized as a force sensor.

The pads 308 may be compressible and may be comprised of silicone or any other compressible or compliant material such as polyester, and/or may comprise other materials such as polycarbonate. The pads 308 provide at least minimal shock-absorbing or buffering protection for the piezo actuator 120, for example, in the event the portable electronic device 100 is dropped, resulting in a more resilient device 100. The pads 308 do not substantially dampen the force applied to or on the touch-sensitive display 118. Each pad 308 is advantageously aligned with a force sensor 122. When the touch-sensitive display 118 is depressed, the force sensor 122 generates a force signal that is received and interpreted by the microprocessor 102. The pads 308 facilitate the focus of forces exerted on the touch-sensitive display 118 onto the force sensors 122. The pads 308 transfer forces between the touch-sensitive display 118 and the actuators 120, whether the force sensors 122 are above or below the pads 308. The pads 308 are advantageously flexible and resilient, and facilitate provision of tactile feedback from the actuators 120 to the touch-sensitive display 118. The pads 308 may also facilitate greater tolerances, such as mechanical tolerances, in assembling and manufacturing the portable electronic device 100 and its assemblies, for example, because the pads 308 may "absorb" unevenness in spacing between the various force sensors 122/actuators 120 and the touch-sensitive display 118.

Figure 5:
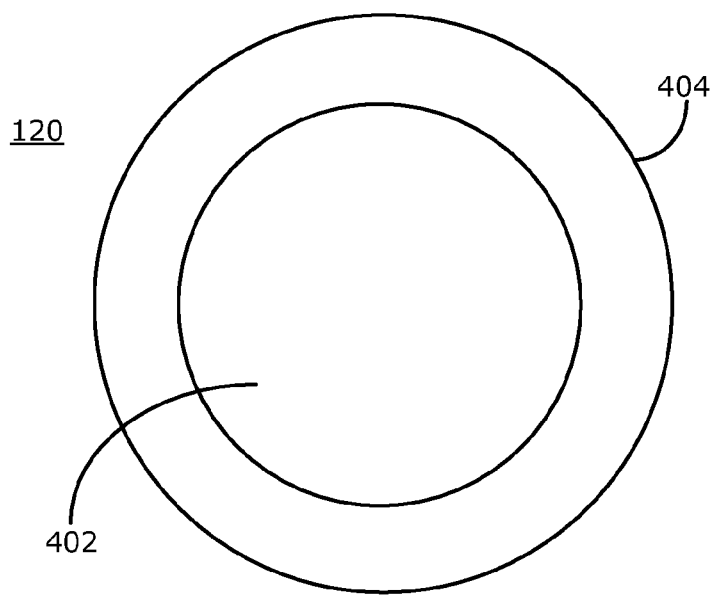
FIG. 5 is a bottom view of a piezoelectric actuator in accordance with the disclosure.

A bottom view of a piezo actuator 120 is shown in FIG. 5. The force sensors 120, supports 302, pads 308, piezo elements 402, and substrates 404 are shown with a circular geometry in FIG. 3 and FIG. 5, although any suitable geometry may be utilized for these devices. For example, rectangular, square, oval, and strip shaped actuators may be utilized. Alternatively, the piezo element 402 may be fastened to the top of the substrate 404, between the force sensor 122 and the substrate 404.

As shown in FIG. 4, the actuator 120 rests on the support 302, but is not fastened to the support 302. The actuator 120 may optionally be fastened to the holder 302 through any suitable method, such as adhesive or other bonding methods.

Figure 6:
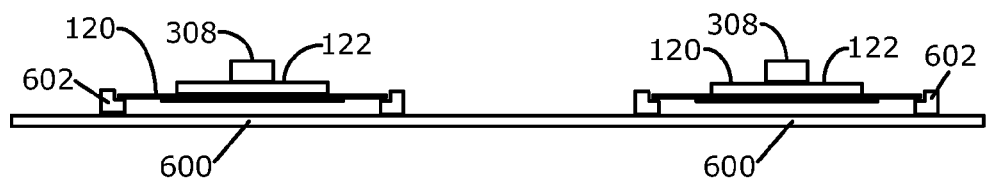
FIG. 6 is a cross-sectional view of piezoelectric actuators disposed on an alternate base in accordance with the disclosure.

A cross-sectional view of piezoelectric actuators disposed on an alternate base 600 is shown in FIG. 6. The supports 602, such as ring-shaped frames, may optionally extend further above the base 600 than the supports 302 of, e.g., FIG. 4 or FIG. 7, and the piezo actuators 120 may rest on the supports 602 or be suspended above the base 300. In this embodiment, no openings need be present in the base 600 below the piezo actuators 120.

Figure 7:
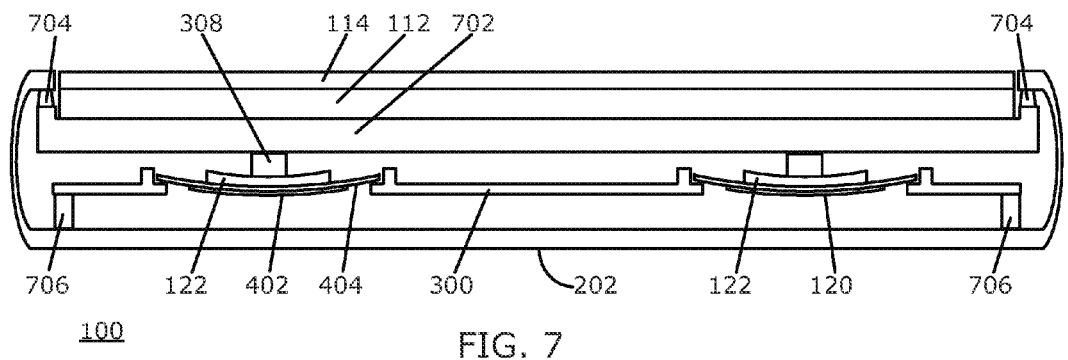
FIG. 7 is a cross-sectional view of piezoelectric actuators and force sensors disposed in a portable electronic device in accordance with the disclosure.

As taken through line II-II of FIG. 3, a cross-sectional view of the portable electronic device 100 is shown in FIG. 7. The touch-sensitive overlay 114 and the display 112 are disposed on a tray 702 above the force sensors 122 and actuators 120.

Spacers 704 may be located between the tray 702 and the housing 202. The spacers 704 may advantageously be flexible and may also be compliant or compressible, and may comprise gel pads, spring elements such as leaf springs, foam, and so forth. The spacers 704 may bias the touch-sensitive display 118, with respect to the pads 308 and/or the force sensors 122, may provide shock absorption between the tray 702 and the housing 202, and/or may limit or control the travel of the tray 702, and thus the touch-sensitive display 118, with respect to the housing 202. The spacers 704 need not remain in contact with the housing 202 during a depression of the touch-sensitive display 118. Standoffs 706 that mechanically or physically connect the base 300 to the housing 202 are shown in FIG. 7, although the base may be fastened to the housing 202 in any other suitable way.

Figure 8:
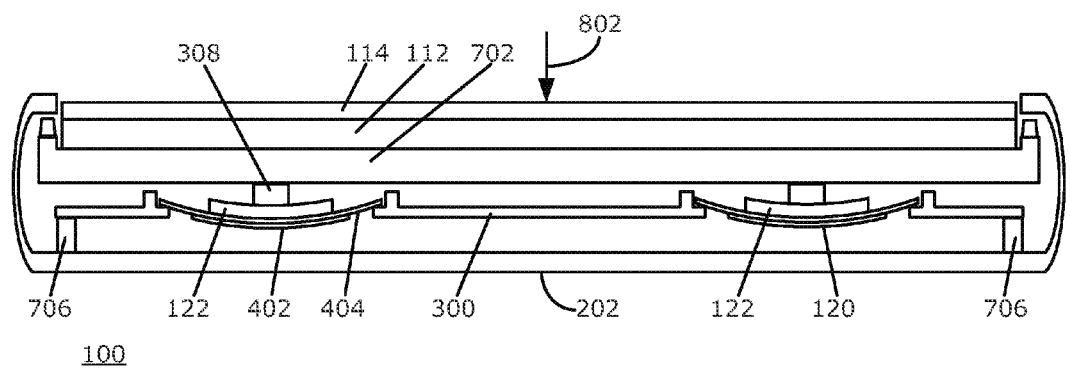
FIG. 8 is a cross-sectional view of a depressed touch-sensitive display in a portable electronic device in accordance with the disclosure.

Absent an external force and absent a charge on the piezo element 402, the piezo element 402 may be slightly bent due to a mechanical pre-load. The actuators 120 are shown with a mechanical pre-load in FIG. 7. As configured within the housing 202, the touch-sensitive display 118 compressively stacks the piezo actuator 120, force sensor 122, and pad 308 against the base 300, resulting in a pre-load of the piezo actuator 120. The pre-load results in a bent or curved actuator 120, as a leaf spring, to facilitate provision of tactile feedback in a direction from the actuator 120 toward the touch-sensitive display 118 and in the opposite direction from the touch-sensitive display 118 toward the actuator 120. Thus, tactile feedback to the touch-sensitive display 118, which is depressible, may simulate the depression and release of a physical key such as a key of a keyboard or a dome switch. The substrate 404 and piezo element 402 may be manufactured with a slight curve or pre-warp, for example, by curing the piezo ceramic to the metal shim with acrylic adhesive. The preload facilitates mechanical coupling between the piezo actuators 120 and the touch-sensitive display 118. The pre-load of the actuators 120 results in a displacement of the center of actuators 120 in the direction of the bottom of the housing 202, for example, 50 to 100 microns. Any other suitable pre-load or displacement may be utilized. The actuators 120 may be further displaced toward the bottom of the housing 202, e.g., 50 to 100 microns, when the touch-sensitive display 118 is depressed as shown in FIG. 8, for example, by an applied force that moves or pivots the touch-sensitive display 118 toward the base 300 or the bottom of the housing 202.

Contraction of the piezo actuators 120 applies a spring-like force, for example, opposing a force externally applied to the touch-sensitive display 118. The substrate 404 bends when the piezoelectric element 402 contracts due to build up of charge at the piezoelectric element 402 or in response to a force, such as an external force applied to the touch-sensitive display 118. The charge may be adjusted by varying the applied voltage, e.g., 150V, or current, thereby controlling the force applied by the piezo element 402. The charge on the piezo element 402 may be removed by a controlled discharge current that causes the piezo element 402 to expand, releasing the force thereby decreasing the force applied by the piezo element 402. The charge may advantageously be removed over a relatively short period of time to provide tactile feedback. Thus, the piezo actuator 120 flattens as it applies force on the touch-sensitive display 118, and bends more as the touch-sensitive display 118 is depressed.

The processor 102 generates and provides an actuation signal to the actuators 120 to provide tactile feedback to the touch-sensitive display 118. The actuation signal includes duration, magnitude or intensity, and frequency of feedback information for the actuators 120. The actuation signal may be based at least in part on the force or the force signal provided by the force sensors 122. The intensity of the feedback may be varied in relation to the amount of the applied force. The actuators 120 may vibrate the touch-sensitive display 118 with respect to the housing 202. The vibration is directed in the z direction, e.g., up and down from the perspective of the drawings. The touch-sensitive display 118 may vibrate, for example, at one or more frequencies between 100 and 160 Hz. Alternatively, the touch-sensitive display 118 may vibrate at multiple frequencies, for example, vibrating at 50 Hz for a tenth of a second and then vibrating at 100 Hz for a tenth of a second. The actuators 120 may be controlled to vibrate the touch-sensitive display 118 over various or varied distances. In another example, the actuators 120 may be controlled vibrate the touch-sensitive display 118 across a varying frequency sweep, for example, 0 Hz to 150 Hz and back to 0 Hz in three tenths of a second. Other tactile feedback, such as pulses, clicks, or pops, may be provided by the piezo actuators 120.

The arrangement of piezo actuators 120 may be utilized to provide tactile feedback instead of a vibrator motor, for example, when a vibration is utilized to notify a user of an incoming phone call instead of a ring tone or other audible notification. Thus, a vibrator motor may be eliminated from the design of the portable electronic device 100. Further, the actuation signal may be varied according to the identity of a caller of a voice communication or sender of a voice communication, thereby providing a tailored notification.

The actuators 120 may emulate the feel of a dome switch collapse and subsequent release, which is similar to simulating the press and release of a key of a keyboard. When a force exerted on the touch sensitive display 118 meets a first force threshold, an actuation signal may be sent to the actuators 120 to simulate the collapse of a dome switch. When the force applied to the touch sensitive display 118 falls below a second force threshold, which may be lower than the first force threshold, an actuation signal may be sent to the actuators 120 to simulate the release of a dome switch. Thus, each time a virtual or soft key is selected by depressing and releasing the touch-sensitive display 118 in accordance with force thresholds, tactile feedback simulating the press and release of a key is provided via the piezo actuators 120. Such feedback simulates typing on a keyboard comprised of physical keys. Similar or other feedback may be provided when a user selects other displayed options, such as decision windows, e.g., a displayed delete or unlock box. Feedback may be provided during the operation of a camera of a portable electronic device 100. For example, depression of the touch-sensitive display 118 may act as a shutter to take and record a digital picture, and the feedback may simulate the feel of a shutter press and release.

Figure 9:
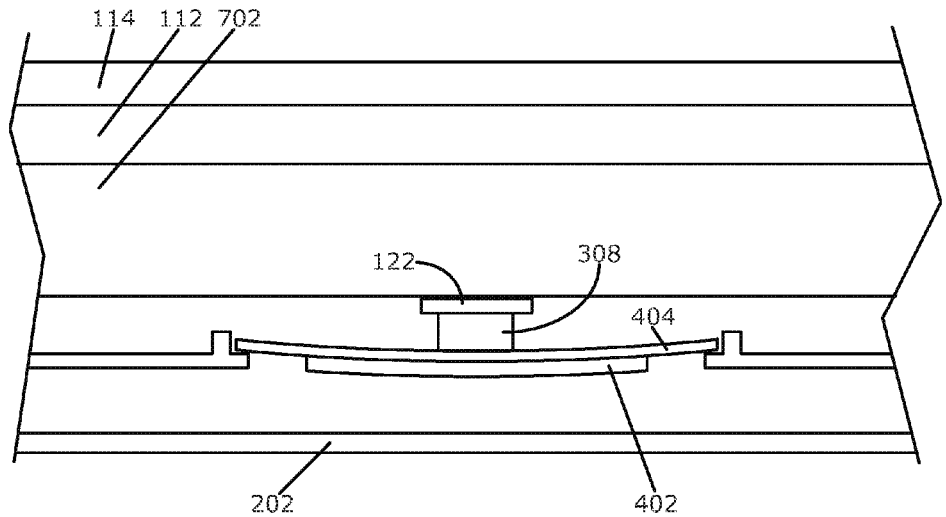
FIG. 9 is a cross-sectional view of an alternative embodiment of piezoelectric actuators and force sensors disposed in a portable electronic device in accordance with the disclosure.

Alternatively, the pad 308 may be disposed between the force sensor 122 and the touch-sensitive display 118, as shown in FIG. 9. Any suitable size of the force sensor 122, the pad 308, piezo element 402, and the substrate 404 may be utilized. The relative sizes of these devices 122, 308, 402, 404 may be chosen to facilitate the response and feedback desired, as well as to fit within the available space. Although the base 300 of FIG. 7 and FIG. 9 is shown with openings to facilitate movement of the actuator 120, the base 600 of FIG. 6 may alternatively be utilized in the embodiment of FIG. 7 or FIG. 9.

The force sensor 122, the pad 308, the substrate 404, and the piezo element 402 are shown advantageously centered with respect to each other. Such an alignment is advantageous because the center of the piezo element 402 has the largest potential displacement distance in the z direction. Nevertheless, other alignments of the force sensor 122 and the pad 308 that are not near or around the central area of the piezo actuator 120 may be successfully implemented. Other arrangements and organizations of these devices 122, 308, 402, 404 may also be successful, including different orders. Each pad 308 may be optionally fastened to the force sensor 122, the substrate 404, the base 300, 600, or any combination thereof. Each force sensor 122 may be optionally fastened to the pad 308, the substrate 404, the base 300, 600, or any combination thereof. An adhesive, lamination, or other suitable measures/processes may be utilized as a fastening mechanism.

Feedback loops resulting from the triggering of the actuators 120 due to forces applied by the actuators 120 may be addressed in software, for example, by any combination of time delays, force thresholds conditions, and so forth.

The methods described herein may be carried out by software executed, for example, by the processor 102. Coding of software for carrying out such a method is within the scope of a person of ordinary skill in the art given the present description. A computer-readable medium having computer-readable code may be executed by at least one processor of the portable electronic device 100 to perform the methods described herein.

A portable electronic device comprises a touch-sensitive display and a piezoelectric actuator arranged to provide tactile feedback to the touch-sensitive display in response to an actuation signal. A pad is disposed in alignment with a force sensor such that depression of the touch-sensitive display causes the force sensor to generate a force signal. A processor is configured to receive the force signal and to generate the actuation signal based on the force signal.

A portable electronic device may alternatively comprise: a housing; a touch-sensitive display movable with respect to the housing; a force sensor and a piezoelectric actuator disposed between the housing and the touch-sensitive display; a pad disposed in alignment with the force sensor such that depression of the touch-sensitive display causes the force sensor to generate a force signal; and a processor configured to receive the force signal and to provide an actuation signal to the piezoelectric actuator, which actuation signal causes the piezoelectric actuator to provide tactile feedback to the touch-sensitive display.

The pad, the force sensor, the piezoelectric actuator, and the touch-sensitive display may be compressively stacked. The pad and the force sensor may be disposed over a central area of the piezoelectric actuator. The pad may be disposed between the force sensor and the piezoelectric actuator. The pad may be disposed between the force sensor and the depressible touch-sensitive display. The touch-sensitive display may be depressible with respect to a housing in which the touch-sensitive display is disposed. The force sensor may be a force-sensitive resistor. The pad may be comprised of at least one of silicone, polyester, and polycarbonate. The portable electronic device may further comprise a housing and a biasing element disposed in the housing to bias the touch-sensitive display toward the piezoelectric actuator and preload the piezoelectric actuator. The portable electronic device may further comprise a support, and a substrate of the piezoelectric actuator may be disposed on the support. The portable electronic device may further comprise a support surrounding an opening disposed in a base and a substrate of the piezoelectric actuator may be disposed on the support.

The drawings are not necessarily drawn to scale. For example, although the tray 702 is shown relatively thick in the figures, the tray 702 may be much thinner relative to the other items shown in the figures. The terms "top" and "bottom," as well as "above" and "below," "horizontal" and "vertical," and "up" and "down" are utilized herein only to provide reference to one's view of the drawings and are not otherwise limiting.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A portable electronic device comprising:
   a touch-sensitive display;
   a piezoelectric actuator arranged to provide tactile feedback to the touch-sensitive display in response to an actuation signal;
   a pad disposed in alignment with a force sensor such that depression of the touch-sensitive display causes the force sensor to generate a force signal, wherein the pad and the force sensor are disposed between the piezoelectric actuator and the touch-sensitive display, and wherein the pad is disposed in alignment with the force sensor to focus forces exerted on the touch-sensitive display onto the force sensor such that depression of the touch-sensitive display causes the force sensor to generate a force signal;
a processor configured to receive the force signal and to generate the actuation signal based on the force signal.

2. The portable electronic device of claim 1, wherein the pad, the force sensor, the piezoelectric actuator, and the touch-sensitive display are compressively stacked.

3. The portable electronic device of claim 1, wherein the pad and the force sensor are disposed over a central area of the piezoelectric actuator.

4. The portable electronic device of claim 1, wherein the pad is disposed between the force sensor and the piezoelectric actuator.

5. The portable electronic device of claim 1, wherein the pad is disposed between the force sensor and the depressible touch-sensitive display.

6. The portable electronic device of claim 1, wherein the touch-sensitive display is depressible with respect to a housing in which the touch-sensitive display is disposed.

7. The portable electronic device of claim 1, wherein the force sensor is a force-sensitive resistor.

8. The portable electronic device of claim 1, wherein the pad comprises at least one of silicone, polyester, and polycarbonate.

9. The portable electronic device of claim 1, further comprising:
a housing;
a biasing element disposed in the housing to bias the touch-sensitive display toward the piezoelectric actuator and pre-load the piezoelectric actuator.

10. The portable electronic device of claim 1, further comprising:
a support;
a substrate of the piezoelectric actuator disposed on the support.

11. The portable electronic device of claim 1, wherein the pad transfers forces between the touch-sensitive display and the actuator.

12. The portable electronic device of claim 1, wherein the pad transfers forces between the touch-sensitive display and the actuator, whether the force sensor is above or below the pad.

13. The portable electronic device of claim 1, wherein the pad does not substantially dampen forces applied to or on the touch-sensitive display.

14. The portable electronic device of claim 1, wherein the pad, the force sensor, the piezoelectric actuator, and the touch-sensitive display are compressively stacked when the display is not depressed.

15. A portable electronic device comprising:
a housing;
a touch-sensitive display movable with respect to the housing;
a force sensor and a piezoelectric actuator disposed between the housing and the touch-sensitive display;
a pad disposed in alignment with the force sensor such that depression of the touch-sensitive display causes the force sensor to generate a force signal, wherein the pad, the force sensor, the piezoelectric actuator, and the touch-sensitive display are compressively stacked when the display is not depressed;
a processor configured to receive the force signal and to provide an actuation signal to the piezoelectric actuator, which actuation signal causes the piezoelectric actuator to provide tactile feedback to the touch-sensitive display.

16. The portable electronic device of claim 15, wherein the pad, the force sensor, the piezoelectric actuator, and the touch-sensitive display are compressively stacked.

17. The portable electronic device of claim 15, further comprising:
a housing;
a biasing element disposed in the housing to bias the touch-sensitive display toward the piezoelectric actuator and pre-load the piezoelectric actuator.

18. The portable electronic device of claim 15, further comprising:
a support surrounding an opening disposed in a base;
a substrate of the piezoelectric actuator disposed on the support.

19. The portable electronic device of claim 15, wherein the force sensor is a force-sensitive resistor.

20. The portable electronic device of claim 15, wherein the pad comprises at least one of silicone, polyester, and polycarbonate.

21. The portable electronic device of claim 15, wherein the pad is disposed in alignment with the force sensor to focus forces exerted on the touch-sensitive display onto the force sensor such that depression of the touch-sensitive display causes the force sensor to generate a force signal.

22. A portable electronic device comprising:
a housing;
a touch-sensitive display movable with respect to the housing;
a force sensor and a piezoelectric actuator disposed between the housing and the touch-sensitive display;
a pad disposed in alignment with the force sensor such that depression of the touch-sensitive display causes the force sensor to generate a force signal, wherein the pad is disposed in alignment with the force sensor to focus forces exerted on the touch-sensitive display onto the force sensor such that depression of the touch-sensitive display causes the force sensor to generate a force signal;
a processor configured to receive the force signal and to provide an actuation signal to the piezoelectric actuator, which actuation signal causes the piezoelectric actuator to provide tactile feedback to the touch-sensitive display.

23. A portable electronic comprising:
a touch-sensitive display;
a piezoelectric actuator arranged to provide tactile feedback to the touch-sensitive display in response to an actuation signal;
a pad disposed in alignment with a force sensor such that depression of the touch-sensitive display causes the force sensor to generate a force signal, wherein the pad and the force sensor are disposed between the piezoelectric actuator and the touch-sensitive display, and wherein the pad, the force sensor, the piezoelectric actuator, and the touch-sensitive display are compressively stacked when the display is not depressed;
a processor configured to receive the force signal and to generate the actuation signal based on the force signal.

* * * * *